United States Patent
Waatti et al.

[11] Patent Number: 5,478,515
[45] Date of Patent: Dec. 26, 1995

[54] SALT BLOCK RELEASE AGENTS

[75] Inventors: Kurt J. Waatti, Crystal Lake, Ill.; Richard A. Bychowski, Ames, Iowa

[73] Assignee: Morton International, Inc., Chicago, Ill.

[21] Appl. No.: 55,127

[22] Filed: Apr. 29, 1993

[51] Int. Cl.⁶ .............................. D04H 1/16; C01D 1/30
[52] U.S. Cl. ..................... 264/113; 23/303; 23/313 R; 264/112; 264/121
[58] Field of Search ..................... 264/113, 120, 264/121, 112, 255; 23/303, 313 R; 428/403, 408

[56] References Cited

U.S. PATENT DOCUMENTS

| | | | |
|---|---|---|---|
| 2,769,787 | 11/1956 | Diamond | 521/26 |
| 3,042,531 | 7/1962 | Leal et al. | 521/26 |
| 3,618,759 | 11/1971 | Kolasinski et al. | 206/509 |
| 3,682,601 | 8/1972 | Fedosoff et al. | 426/454 |
| 4,769,159 | 9/1988 | Copeland | 252/8.8 |

*Primary Examiner*—D. S. Nakarani
*Assistant Examiner*—H. Thi Le
*Attorney, Agent, or Firm*—Robert M. Didrick; Gerald K. White

[57] ABSTRACT

A water soluble dicarboxylic acid acts as a mold release agent for salt blocks when it is sprayed as a fine powder into the block press mold box just prior to a charge of salt. The acid has from 6 to 10 carbon atoms; adipic acid is a preferred release agent. The salt block having a layer of the acid on it surface may be used in water softening systems wherein the block sits in a brine reservoir and supplies salt for the recharging of an ion exchange resin. There is no build up of an unsightly scum on the surface of the brine and on the sides of the reservoir as there has been with the use of calcium stearate as the release agent.

4 Claims, 1 Drawing Sheet

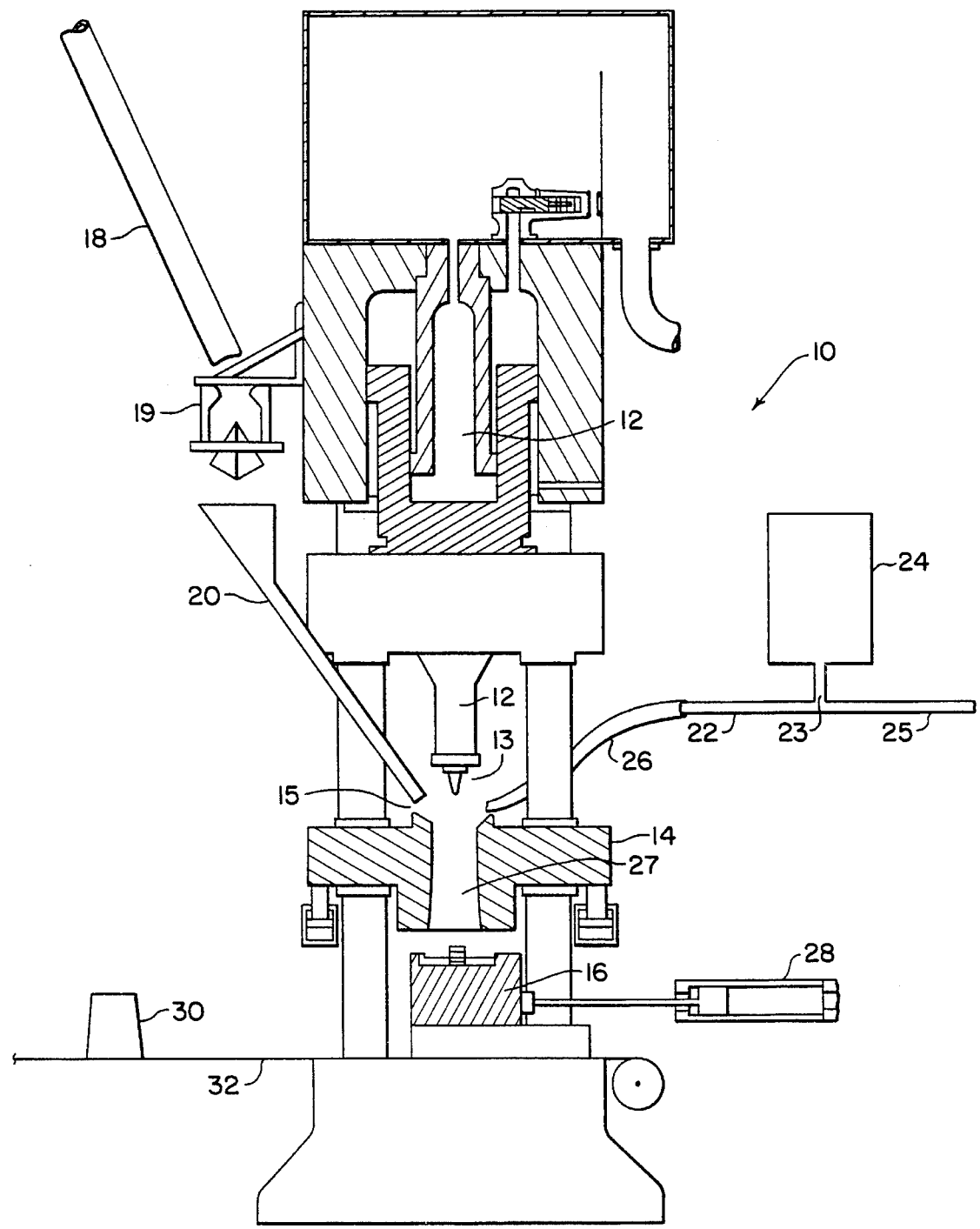

SALT BLOCK RELEASE AGENTS

BACKGROUND OF THE INVENTION

This invention relates to a method for molding blocks of water soluble alkali metal halides such as sodium and potassium chloride and to a novel release agent which facilitates the release of the blocks from the mold. For the purposes of this invention, the meaning of the term salt block will include blocks of all such water soluble alkali halides, especially those which have utility in the recharging of ion exchange resins in water softening systems. More particularly, this invention relates to an improved method for molding salt blocks whereby the wear of the block press mold box is minimized. More particularly, the invention relates to a method for molding salt blocks wherein the block release agent is water-soluble and therefore does not generate an unsightly scum in brine tanks used in water softening systems.

The most common method for softening water is the cation exchange method in which hard water is brought into contact with beads of a cation exchange resin whereby sodium ions in the resin are replaced by the calcium and magnesium ions that were in the water and the sodium ions are taken up by the water. When the resin is essentially depleted of sodium ions it is recharged by passing brine through the bed of resin beads to remove the calcium and magnesium ions as the soluble chlorides and replace them again with the sodium ions. To generate the brine, sodium chloride in the form of pellets or blocks is placed in a tank and is dissolved by allowing it to sit in a measured amount of water in the tank for a sufficient time before each recharging cycle.

A salt block is a compressed mass of sodium chloride and additives and is commonly made in two sizes—25 and 50 pounds. The approximate dimensions of the 50 pound block are 8" wide×8" long×11" high. It resists handling and shipping damages and it resists disintegration when stored in brine.

In the production of salt blocks, a release agent is required to minimize wear and damage to the inner surfaces of the block press mold box. These surfaces are commonly those of a stainless steel liner of the box. Calcium stearate is believed to be the most commonly used release agent in the salt industry. The residue of calcium stearate on the blocks of salt that are dissolved in a brine tank is insoluble, however, and the accumulation of said residue forms an unsightly surface scum in the tank. It is highly desirable, therefore, to find a material that has suitable release properties when on the surface of a salt block in the press mold box but does not form a scum when the salt is dissolved in a brine tank.

SUMMARY OF THE INVENTION

It is an object of this invention, therefore, to provide a water-soluble release agent for a press mold box used for the production of salt blocks.

It is another object of this invention to provide a salt block for use in the generation of brine in a tank of a water softening system which does not cause the formation of scum in the tank.

It is another object of this invention to provide a method for making a salt block.

It is a related object of this invention to provide a method for regenerating a cation exchange resin in a water softening system.

These and other objects of this invention which will become apparent from the following description are achieved by a method for manufacturing compressed blocks of salt which comprises applying a water-soluble dicarboxylic acid as a block release agent to the salt-contacting surfaces of a block press mold box, introducing crystalline salt into the box, forming the salt into a block with pressure, and releasing the block from the box with a lesser pressure.

BRIEF DESCRIPTION OF THE DRAWING

The drawing is a cross-section of a salt block press used in the method of this invention.

DETAILED DESCRIPTION OF THE INVENTION

A balance between water solubility and good lubricant qualities is important to the operation of the method of this invention and to the use of the resulting salt block in water softening systems. Preferably, therefore, the acid will have from 6 to 10 carbon atoms which, more preferably, are in a straight chain as exemplified by adipic, pimelic, subaric, azelaic, and sebacic acid. As the number of carbon atoms in the acid increases the lubricity increases and the water solubility decreases. The forming pressure for the method of this invention is from about 18,000 to about 20,000 psi. The release pressure, which is the initial pressure required to break the frictional bond between the salt block and the mold surfaces and is therefore related to the lubricity of the acid serving as a block release agent, is from about 2500 to about 5000 psi. The ratio between the release pressure and the forming pressure, therefore, is from about 0.125 to about 0.25. In consideration of the lubricity, cost, and acidity of the acids, adipic acid is particularly preferred. A further advantage of adipic acid is that iron that may be present in the water supply is maintained in a soluble form in the brine of the water softening system by the adipic acid as the brine stands in the reservoir.

The acid is in the form of a very fine powder so that it can be distributed over the liner surfaces as a substantially uniform thin layer from about 2 to about 6 mils thick. Preferably, the particle size is about minus 200 mesh. A dessicant such as a silica sold under the trademark Silox 15 may be added to the acid in an amount of about 0.25% by weight of the mixture prior to pulverization to reduce caking of the powdered acid. The amount of acid distributed on the inner surfaces of the mold box is from about 2 to about 10 mg/cm$^2$. A portion of it is transferred from the mold surfaces to the surfaces of the block during the compression to give a layer averaging in thickness from about 0.2 mil to about 3 mils.

Turning now to the drawing, the block press 10 is a Columnar Elmes 1000 ton press. Compression energy is obtained from hydraulic pressure generated by a series of motors and pumps (not shown) through which hydraulic fluid is circulated. In the rest mode of the press, the main ram 12 and the top die 13 attached to it are retracted in the up position, the mold box 14 and the collar 15 integral therewith are in the down position, and the anvil 16, which acts as a slidable floor for the mold box, is in the forward position. The salt delivery conduit 18 communicates with a storage bin (not shown) and the scale 19, which is mounted independently of the press 10 in dispensing relation above the salt spout 20 which, in turn, is mounted in dispensing relation with the mold box 14. Also communicating with the mold box is the acid powder delivery line 22 in which the venturi 23 communicates with the acid storage tank 24. The air conduit 25 conducts air from a compressor (not shown) into the venturi 23 which draws powder from the tank 24 into line 22 onto which the flexible tubing 26 is attached as an extension. The tubing 26 is disposed on the collar 15 in communication with the chamber 27 of the mold box 14. The anvil cylinder 28 is connected to the anvil 16 in push-pull operative relation therewith.

In operation, one block 30 having a nominal weight of 50 pounds is made every 12 seconds by admitting compressed air into the line 25 and venturi 23 where the induced vacuum draws the powdered acid into the air stream, injecting the acid into the chamber 27, charging about 50.5 pounds of salt into the scale 19 and releasing it onto the spout 20 from which it pours into the chamber 27. The top die 13 is forced against the salt in the mold box chamber by hydraulic pressure to compress the salt at a preset pressure limit of from about 18,000 to about 20,000 psi. Both the spout 20 and the line 22 are disposed away from the path of the descending die 13. When the pressure limit is reached, the main ram and mold box are raised and the anvil cylinder 28 retracts the anvil before the main ram is again pressurized again to force the block 30 out of the mold box chamber 27 onto the conveyor 32 which delivers the block to a pelletizing area. The sequence and timing of the steps are determined by a conventional controller (not shown) such as an Allen Bradley PLC 5 controller.

Having read the foregoing detailed description of the preferred embodiments of the invention, one of ordinary skill in the art of compression molding will appreciate that many other embodiments of the invention may be made without departing from the scope of the invention as defined by the following claims.

The subject matter claimed is:

1. A method for manufacturing compressed blocks of salt which comprises applying a water-soluble dicarboxylic acid having from 6 to 10 carbon atoms as a layer of powder to the salt-contacting surfaces of a block press mold box by drawing the powder into an air stream and injecting said powder in said air stream into the mold box, introducing a water-soluble crystalline alkali metal halide salt into the box, forming the salt into a block in the mold box with pressure, and releasing the block from the box under a lesser pressure.

2. The method of claim 1 wherein the amount of acid is from about 2 to about 10 mg/cm$^2$ of surface area.

3. The method of claim 1 wherein the acid is adipic acid.

4. The method of claim 1 wherein the ratio of the release pressure to the forming pressure is from about 0.125 to about 0.25.

* * * * *